Nov. 29, 1966  F. E. STUART  3,288,297
FILTER BED AGITATOR
Filed March 30, 1964  2 Sheets-Sheet 1

INVENTOR
FRED E. STUART
BY Toulmin & Toulmin
ATTORNEY

Nov. 29, 1966 — F. E. STUART — 3,288,297
FILTER BED AGITATOR
Filed March 30, 1964 — 2 Sheets-Sheet 2
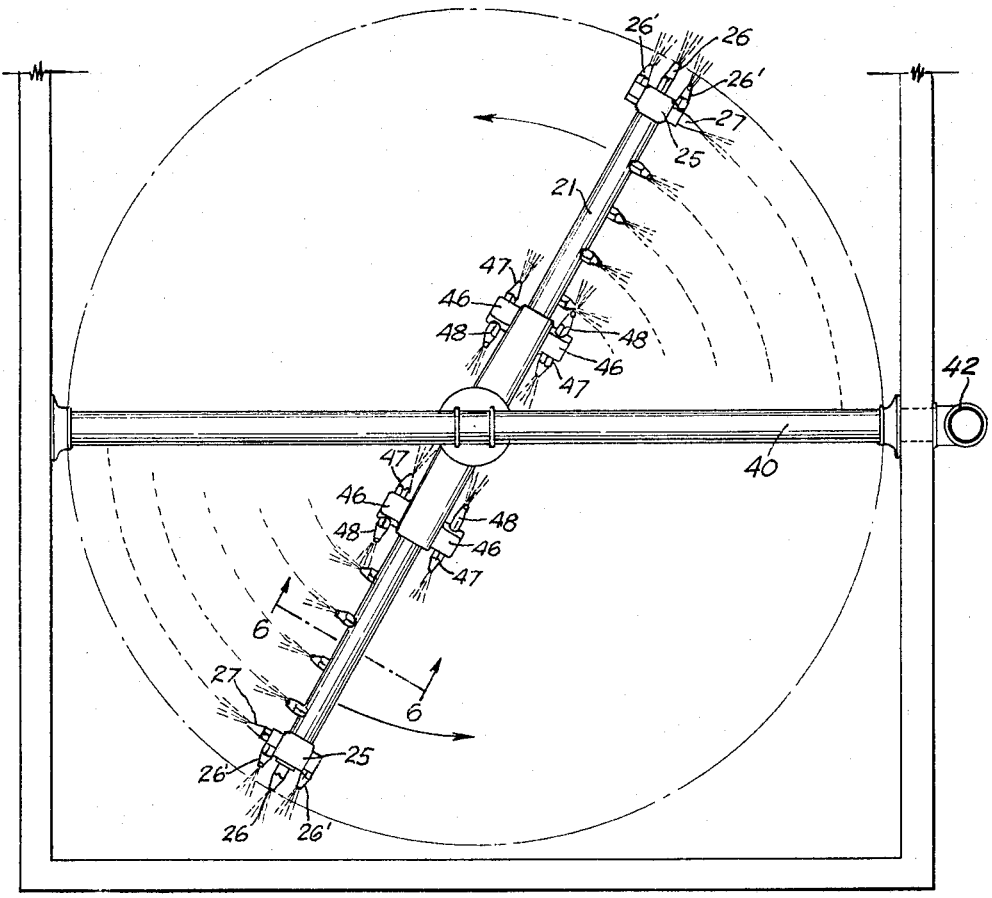
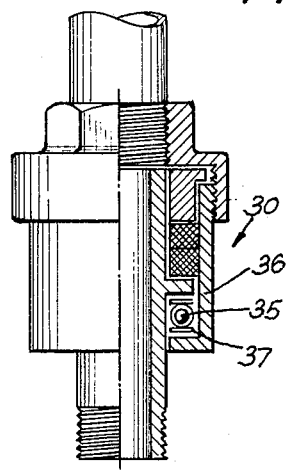
Fig. 5
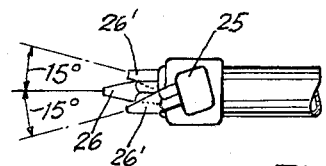
Fig. 2
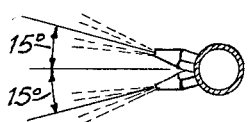
Fig. 7
Fig. 6
INVENTOR
FRED E. STUART
BY Toulmin & Toulmin
ATTORNEYS United States Patent Office 3,288,297
Patented Nov. 29, 1966

3,288,297
FILTER BED AGITATOR
Fred E. Stuart, 516 N. Charles St., Baltimore, Md.
Filed Mar. 30, 1964, Ser. No. 355,662
7 Claims. (Cl. 210—272)

This invention relates to improvements in filtering systems, and more particularly to rotatable filter bed agitators for use in cleaning filter beds.

The invention provides an improved filter bed agitator used in the washing of filters in surface wash operations.

More particularly, the invention relates to a rotating agitator having horizontal radially extending arms carrying jets which deliver water up to 115 feet per second. The agitator rotates in a horizontal plane about two inches above the filter sand with some jets pointing downwardly 15° from the horizontal and others pointing upwardly 15° to the horizontal. These jets create a terrific turbulence in a semi-horizontal plane across the entire width of the filter.

The regular type of surface wash agitator has all jets pointing downwardly thereby driving the dirty water back into the filter, to be removed later by large quantities of wash water.

It is the object of this invention to create, during backwashing of the bed, an upward and outward discharge of the flocculated material, due to the upwardly inclined jets.

Another object of the invention is to employ jets at the central portion or center T of the agitator acting transversely to the jets of the radially extending arms, wherein the jets of the central portion extend in a radial direction, and the jets of the radially extending arms extend in a circumferential direction.

Still another object of the invention is to have pairs of jets at the center portion operating in opposite directions to increase the turbulence.

A further object is to have the arms terminate in T-members carrying jets operating in both radial and circumferential directions.

Wash water is fed into the hollow revolvable agitator and discharged from the jets which are arranged in spaced relationship along the length of the agitator arms. Higher velocity jets of wash water are applied to the upper portion of the filter bed as the agitator arms rotate through the agitated filter medium. The filter medium is preferably composed of fine sand and/or particles of charcoal, or mixtures of solid particles and such as conventionally used in filter beds. The agitator arms comprise two sets of jets arranged at different angles with respect to the agitator arms, and spaced along the length of each arm, one set of jets being positioned to direct jets of water upwardly and the other set arranged to direct like jets of water downwardly. The jets at the center portion or center T of the agitator also extending upwardly and downwardly as well as transversely of the jets of the radially extending arms. The filter bed is thus agitated with high velocity jet streams of water concurrently and over the entire upper surface layer of the filter bed.

Like jets located at the ends of the rotating agitator arms direct jet streams of water outwardly thereof at different angles to the horizontal to provide a thorough cleaning action over the entire upper layer of the filter bed. In this manner the foreign matter which collects on the filter bed is separated from the filter medium and is drawn off with waste water and the cleaned sand or filter medium returned to the filter bed for reuse.

The alternate arrangement of the jets on the rotating agitator arms combined with the arrangement whereby the path of the jets on one arm are arranged to alternate with the path of the jets on the other arm, provides a filter sweeping action which results in a maximum agitation of the filter bed.

Other objects and advantages of the invention will be apparent from the following description of a preferred embodiment of the invention, and taken in conjunction with the drawings, wherein:

FIGURE 2 is a plan view of the filter bed shown in FIGURE 1, and illustrating the multiple jet and sweeping action of the revolving agitator arms of this invention;

FIGURE 5 is the ball bearing supporting joint for the rotatable agitator;

FIGURE 6 is a sectional view taken on the line 6—6 of FIGURE 2 and looking in the direction of the arrows, and showing the angular arrangement of the jets;

FIGURE 7 shows a side view of one of the end members or end T of one of the agitator arms showing the angular arrangement of the end jets.

Figure 1:
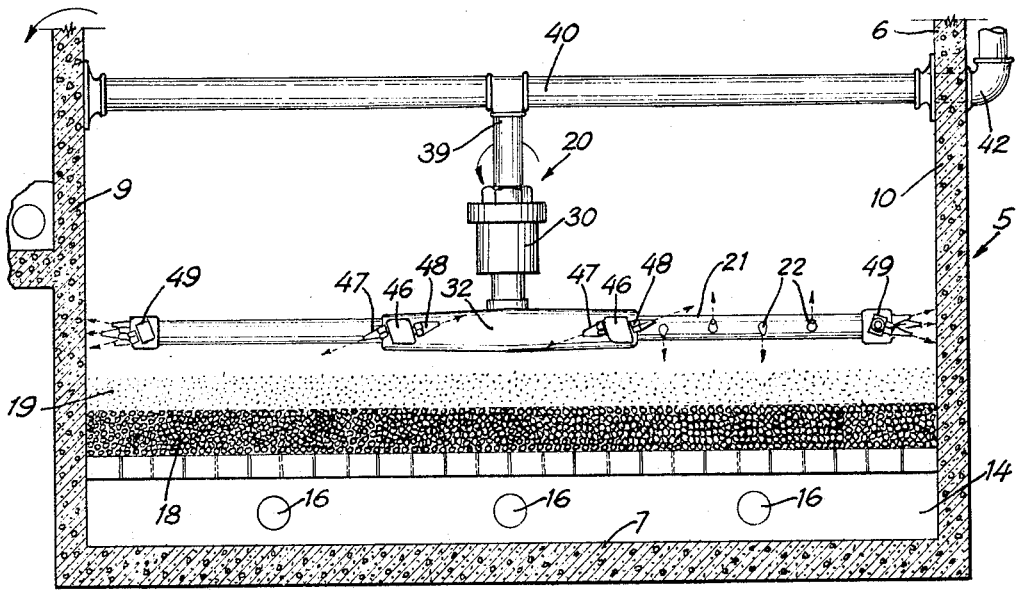
FIGURE 1 is a vertical sectional view taken through a filter bed and illustrating the use of my rotating or revolving multiple jet agitator.

Referring to the drawings in more detail, reference character 5 designates a filter bed of any desired size and dimensions and which may constitute one or more filter bed units of a water filtering plant. The filter bed 5, as illustrated in FIGURE 1, comprises a concrete tank 6 having a bottom wall 7 and side walls 9 and 10. Intermediate the top and bottom wall of the tank is a perforated wall 12 extending between the side walls 9 and 10 and defining a well 14 therebetween for filtered water. Conduits 16 communicate with the well 14 for drawing off filtered water which has passed through the filter bed. The filter medium of the filter bed consists of coarse gravel 18 and an upper layer 19 consisting of fine particles such as sand or the like as aforementioned.

Figure 3:
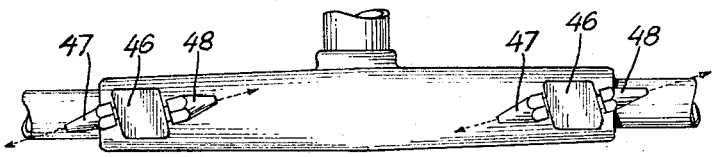
FIGURE 3 is a plan view of a filter bed shown in FIGURE 1, and illustrating the multiple jet and sweeping action of the revolving agitator arms of this invention.
Figure 4:
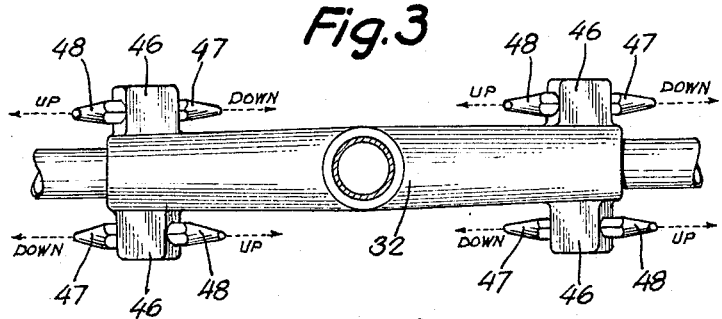
FIGURE 4 is a plan view of the center T shown in FIGURE 3.

Mounted for rotation in the filter bed 5 is a revolvable agitator arm means or unit, generally designated 20. The agitator arm means 20 illustrated in FIGURES 2 and 3 consists of an inverted T structure, as shown and comprising a central inverted T 32 from the ends of which extend agitator arms 21 which terminate in end T's or members 25. The center T's have opposed pairs of hollow projections 46 adjacent each end thereof. The hollow projections, arms and end T's all have jets threaded thereinto, as illustrated. The jets 22 in the arms are alternately arranged to deliver jets of water downwardly and upwardly at 15° to the horizontal plane of rotation of the agitating arms. The jets 47 on the projections of the center T project a stream of water downwardly and radially and the jets 48 on the projections, as shown in FIGURE 3, project a stream of water upwardly and radially 15°, to the said horizontal plane. The jets 26' on the end T's project a jet of water downwardly and upwardly respectively, and jets 26 project horizontally. Jets 27 on the end T 25 and the jets 22 on the agitator arms project rearwardly of the direction of rotation of the agitator.

To cause the agitator 20 to revolve counter-clockwise, as illustrated by the arrows in FIGURE 2, the jets along one radius of the arm are arranged to deliver jets of water in one direction while along the opposite radius of the agitator the jets are arranged to discharge jets of water in the opposite direction. The reaction forces thus add together to cause the agitator to rotate about a central vertical axis as shown in FIGURE 2.

The agitator arm 21 is carried at its center portion on a ball bearing assembly 30, the agitator being connected to the assembly by a T section or center T 32 and threaded nipple 33. The weight of the revolving agitator 20 is supported on the bearing assembly 30, the latter comprising stainless steel balls 35 contained in a brass shell 36, and stainless steel wearing plates 37. The agitator and bearing assembly are connected through a pipe 39 to a cross pipe 40 which is secured at its opposite ends to the tank walls 9 and 10 respectively. Wash water is emptied under pressure from a suitable source through the pipe 42 which communicates with the pipe 40 and hence to the revolvable agitator when the water is discharged from the jets 22, 26, 26', 27, 47 and 48 in jet streams.

The agitator is connected to the water line 42 and caused to revolve by the jet reaction forces developed at the jets. Rotation of the agitator and jet washing of the filter bed is carried out concurrently during back washing of the filter bed. The resultant agitation and washing action separate the foreign matter from the filter medium which foreign matter is flushed away over the wall 9 into the waste drain 43, as indicated by the arrow in FIGURE 1.

During operation of the filter system to clean and wash the filter bed, clean wash water is introduced under pressure to the agitator which is recooled by the reaction forces created by water discharging from the jets of the agitator resulting in maximum agitation and cleaning action of the filter medium.

The invention, as heretofore pointed out, is adapted to wash the filter medium with a minimum amount of water. Wash water under a pressure of 40–125 pounds per square inch is directed beneath and upwardly of the filter medium. Utilizing the rotating agitator of the invention, the filter bed is expanded and agitated thoroughly during the jet action so that the foreign matter is dislodged and washed from the surface of the sand particles and removed, providing a clean filter bed.

In accordance with the invention, the rotating jet agitator, as illustrated in the drawing, may comprise a plurality of such agitators in a large filter bed. The size and number of jet agitators, of course, depends upon the area of the filter sand treated.

It will be understood that this invention is susceptible to modification in order to adapt it to different usages and conditions, and accordingly, it is desired to comprehend such modifications within this invention as may fall within the scope of the appended claims.

What is claimed is:

1. A jet agitator for sand in a water filtering system comprising a device mounted to rotate in a given plane and in a given direction, said device having a hollow central inverted T-shaped member rotatably supported from above on bearings, said T-shaped member having hollow radially extending arms terminating in hollow T-shaped end members, the cross arms of said T-shaped end members and said radially extending arms all rotatable in said given plane, said radially extending arms carrying spaced jets only on the side thereof opposite the direction of rotation, alternate jets being directed downwardly and upwardly respectively approximately 15° from said plane of rotation, said central T-shaped member having a plurality of lateral projections, each projection carrying a pair of radially extending opposed jets projecting downwardly and upwardly approximately 15° respectively from said plane whereby when water is forced through said members and arms under high pressure, the device will rotate and create turbulence in the surrounding medium.

2. The invention as defined in claim 1, wherein said hollow cross arms of said T-shaped end members each have a jet extending radially outwardly in said plane and a pair of jets projecting downwardly and upwardly respectively approximately 15° from said plane.

3. The invention as defined in claim 1, wherein said plane of rotation is above and closely adjacent to the normal upper surface of the filter medium.

4. A device for cleaning a filter screen comprising a hollow inverted central T-member suspended from the middle leg to freely rotate about the longitudinal axis thereof wherein the cross-leg of the central T-member rotates in a given plane in a given direction, said cross-leg having oppositely and longitudinally extending hollow radial arms, each terminating in a hollow T-shaped member, said cross leg also having a pair of laterally extending oppositely positioned hollow projections at each end thereof; said projections, arms and T-shaped terminal members lying in said given plane and rotatable therein; each of said projections having a pair of oppositely extending radially directed jets, one directed downwardly and the other directed upwardly, each at an angle of substantially fifteen degrees to the said given plane; each of said arms having spaced circumferentially extending jets projecting only from the side thereof rearwardly of said direction of rotation, alternate jets on said arms projecting upwardly and downwardly respectively, at angles of substantially fifteen degrees to the said given plane, and said terminal members having a plurality of jets extending radially of said direction of rotation.

5. The invention as defined in claim 4, wherein at least one of the jets on the terminal members is directed downwardly and at least one is directed upwardly, each at an angle of approximately fifteen degrees to the said given plane.

6. In combination, a sand and gravel filter having a normal surface level, a rotatable jet cleaning device suspended for rotation in a given plane above and closely adjacent said normal surface level, said device comprising a hollow inverted T-member suspended from the middle leg to freely rotate about the longitudinal axis thereof wherein the cross-leg of the T-member rotates in said given plane in a given direction, said cross-leg having oppositely and longitudinally extending hollow radial arms, each terminating in a hollow T-shaped member, said cross leg also having a pair of laterally extending oppositely positioned hollow projections at each end thereof; said projections, arms and T-shaped terminal members lying in said given plane and rotatable therein; each of said projections having a pair of oppositely extending radially directed jets, one directed downwardly and the other directly upwardly, each at an angle of substantially fifteen degrees to the said given plane; each of said arms having spaced circumferentially extending jets, projecting only from the side thereof rearwardly of said direction of rotation, alternate jets on said arms projecting upwardly and downwardly respectively at angles of substantially fifteen degrees to the said given plane, and said terminal members having a plurality of jets extending radially of said direction of rotation, wherein there is produced a maximum agitation of the filter bed.

7. The invention as defined in claim 6, wherein at least one of the jets on the terminal members is directed downwardly and at least one is directed upwardly, each at an angle of approximately fifteen degrees to the said given plane.

No references cited.

REUBEN FRIEDMAN, *Primary Examiner.*

SAMIH ZAHARNA, *Examiner.*